United States Patent
Barkai

(10) Patent No.: US 10,427,976 B2
(45) Date of Patent: Oct. 1, 2019

(54) GLASS TUBE WITH INFRARED LIGHT REFLECTIVE COATING, METHOD FOR MANUFACTURING THE GLASS TUBE, HEAT RECEIVER TUBE WITH THE GLASS TUBE, PARABOLIC TROUGH COLLECTOR WITH THE HEAT RECEIVER TUBE AND USE OF THE PARABOLIC TROUGH COLLECTOR

(75) Inventor: Menashe Barkai, Tel Aviv (IL)

(73) Assignee: SIEMENS CONCENTRATED SOLAR POWER LTD. (IL)

( * ) Notice: Subject to any disclaimer, the term of this patent is extended or adjusted under 35 U.S.C. 154(b) by 437 days.

(21) Appl. No.: 14/345,304

(22) PCT Filed: Sep. 30, 2011

(86) PCT No.: PCT/EP2011/067120
§ 371 (c)(1),
(2), (4) Date: May 1, 2014

(87) PCT Pub. No.: WO2013/044975
PCT Pub. Date: Apr. 4, 2013

(65) Prior Publication Data
US 2014/0283817 A1  Sep. 25, 2014

(51) Int. Cl.
*F24S 10/40* (2018.01)
*C03C 17/34* (2006.01)
(Continued)

(52) U.S. Cl.
CPC .......... *C03C 17/3417* (2013.01); *F22B 1/006* (2013.01); *F24S 10/45* (2018.05);
(Continued)

(58) Field of Classification Search
CPC ........ C03C 17/3417; F24J 2/055; F24J 2/485; F24J 2/505
(Continued)

(56) References Cited

U.S. PATENT DOCUMENTS

| 3,957,029 A | 5/1976 | Nozik et al. |
| 3,981,293 A | 9/1976 | Gillery |

(Continued)

FOREIGN PATENT DOCUMENTS

| CN | 101437771 A | 5/2009 |
| GB | 2031756 A | 4/1980 |

(Continued)

OTHER PUBLICATIONS

JP Pat. Appl. No. 2014-532256; Office Action dated Aug. 3, 2015; 5 pgs.

(Continued)

*Primary Examiner* — Jason Lau
(74) *Attorney, Agent, or Firm* — Schmeiser, Olsen & Watts LLP

(57) ABSTRACT

A glass tube with a glass tube wall is provided, wherein an inner surface of the glass tube wall comprises at least partially at least one infrared light reflective coating. Additionally a heat receiver tube for absorbing solar energy and for transferring absorbed solar energy to a heat transfer fluid, which can be located inside a core tube of the heat receiver tube, is provided. The core tube comprises a core tube surface with a solar energy absorptive coating for absorbing solar absorption radiation of the sunlight. The core tube surface and an encapsulation are arranged in a distance between the core tube surface and the inner surface of the encapsulation wall with the infrared reflective surface such, that the solar absorption radiation can penetrate the encapsulation with the infrared light reflective coating and can impinge the solar energy absorptive coating.

16 Claims, 1 Drawing Sheet

(51) Int. Cl.
*F22B 1/00* (2006.01)
*F24S 80/52* (2018.01)
*F24S 70/20* (2018.01)
*F28F 13/18* (2006.01)
*F28F 19/02* (2006.01)
*F28F 21/00* (2006.01)
*F28F 21/08* (2006.01)
*F28B 3/02* (2006.01)
*F24S 23/74* (2018.01)
*F24S 70/30* (2018.01)
*F24S 20/20* (2018.01)
*F24S 23/70* (2018.01)

(52) U.S. Cl.
CPC .............. *F24S 70/20* (2018.05); *F24S 80/52* (2018.05); *C03C 2217/948* (2013.01); *C03C 2218/365* (2013.01); *F24S 20/20* (2018.05); *F24S 23/74* (2018.05); *F24S 70/30* (2018.05); *F24S 2023/86* (2018.05); *F28B 3/02* (2013.01); *F28F 13/18* (2013.01); *F28F 13/185* (2013.01); *F28F 19/02* (2013.01); *F28F 21/00* (2013.01); *F28F 21/089* (2013.01); *F28F 2245/00* (2013.01); *Y02E 10/44* (2013.01); *Y02E 10/46* (2013.01)

(58) Field of Classification Search
USPC ........................................ 126/652, 676, 694
See application file for complete search history.

(56) References Cited

U.S. PATENT DOCUMENTS

| | | | | |
|---|---|---|---|---|
| 4,153,041 | A | | 5/1979 | Grauleau et al. |
| 4,579,107 | A | * | 4/1986 | Deakin .................. C03C 17/10 |
| | | | | 126/654 |
| 4,846,151 | A | * | 7/1989 | Simko, Jr. .............. F24J 2/0444 |
| | | | | 126/658 |
| 5,653,222 | A | * | 8/1997 | Newman .................. F24J 2/265 |
| | | | | 126/653 |
| 2005/0126560 | A1 | * | 6/2005 | Litwin ...................... F24J 2/085 |
| | | | | 126/683 |
| 2010/0089444 | A1 | * | 4/2010 | Thomsen ........ H01L 31/022466 |
| | | | | 136/256 |
| 2010/0205963 | A1 | | 8/2010 | Ammar |
| 2010/0229853 | A1 | * | 9/2010 | Vandal .................. F24J 2/1057 |
| | | | | 126/684 |

FOREIGN PATENT DOCUMENTS

| | | |
|---|---|---|
| JP | S51140248 A | 12/1976 |
| JP | 54 056272 A | 5/1979 |
| JP | S5572760 A | 5/1980 |
| JP | 9035534 A | 2/1997 |
| JP | 2009522534 A | 6/2009 |
| WO | WO 2004056564 A1 | 7/2004 |
| WO | WO 2007113259 A2 | 10/2007 |
| WO | 2009/041947 A1 | 4/2009 |
| WO | WO 2010035064 A1 | 4/2010 |
| WO | WO 2011084902 A2 | 7/2011 |

OTHER PUBLICATIONS

Australian Pat. Appl. No. 2011377920; Office Action dated Aug. 7, 2015; 3 pgs.
Chinese Pat. Appl. No. 2011800736611; Office Action dated Jun. 11, 2015; 19 pgs.
PCT/EP2011/067120—International File Date: Sep. 30, 2011—International Search Report & Written Opinion dated Jul. 18, 2012; Siemens Aktiengesellschaft; 12 pgs.
European Examination Report dated Nov. 21, 2017—Application No. 11 770 395.9.
Chinese Pat. Appl. No. 201180073661.1; Office Action dated Jan. 22, 2017; 14 pgs.

* cited by examiner

GLASS TUBE WITH INFRARED LIGHT REFLECTIVE COATING, METHOD FOR MANUFACTURING THE GLASS TUBE, HEAT RECEIVER TUBE WITH THE GLASS TUBE, PARABOLIC TROUGH COLLECTOR WITH THE HEAT RECEIVER TUBE AND USE OF THE PARABOLIC TROUGH COLLECTOR

CROSS-REFERENCE TO RELATED APPLICATIONS

This application claims priority to PCT/EP2011/067120, having a filing date of Sep. 30, 2011, the entire contents of which are hereby incorporated by reference.

FIELD OF TECHNOLOGY

This invention relates to a glass tube. Moreover, a heat receiver tube with the glass tube and a parabolic trough collector with the heat receiver tube are provided.

BACKGROUND

A sun energy collecting unit of a sun field power plant based on the concentrated solar power technique is for instance a parabolic trough collector with parabolic mirrors and a heat receiver tube. The heat receiver tube is arranged in a focal line of the mirrors. By sunlight reflecting surfaces of the mirrors the sunlight is focused to the heat receiver tube, which is filled with a heat transfer fluid, e.g. a thermo-oil or molten salt. With the aid of a solar radiation absorptive coating of a core tube (inner tube) the heat receiver tube absorbs energy from the sun. Energy from the sun is efficiently coupled into the heat transfer fluid. Solar energy is converted to thermal energy.

In order to minimize a loss of thermal energy, the heat receiver tube comprises an encapsulation out glass (glass tube). The glass tube, which is transparent for the sunlight, is arranged coaxially around an inner, central stainless tube of the heat receiver tube. The space between the inner tube and the glass tube is evacuated.

SUMMARY

An aspect relates to providing an additional reduction of thermal loss of a glass tube, which can be used as an encapsulation of a heat receiver tube.

A further aspect is the providing of a parabolic trough collector with the heat receiver tube comprising an encapsulation with such a glass tube.

These aspects are achieved by the invention specified in the claims.

A glass tube with a glass tube wall is provided, wherein an inner surface of the glass tube wall comprises at least partially at least one infrared light reflective coating.

The glass tube can be manufactured with following steps: The method comprises following steps: a) providing a glass tube and b) attaching the infrared light reflective coating onto an inner surface of the glass tube.

Additionally a heat receiver tube for absorbing solar energy and for transferring absorbed solar energy to a heat transfer fluid, which can be located inside a core tube of the heat receiver tube, is provided. The core tube comprises a core tube surface with a solar energy absorptive coating for absorbing solar absorption radiation of the sunlight. The core tube is enveloped by an encapsulation with the glass tube with the infrared light reflective coating. The core tube surface and the encapsulation are arranged in a distance between the core tube surface and the inner surface of the encapsulation wall with the infrared reflective surface such, that the solar absorption radiation can penetrate the encapsulation with the infrared light reflective coating and can impinge the solar energy absorptive coating.

Moreover a parabolic trough collector is provided comprising at least one parabolic mirror having a sunlight reflecting surface for concentrating sunlight in a focal line of the sunlight reflecting surface and at least one heat receiver tube, which is arranged in the focal line of the parabolic mirror. Alternatively, a solar collector with linear Fresnel technology can be realized. So, a linear Fresnel mirror collector with at least one Fresnel mirror having a sunlight reflecting surface for concentrating sunlight in a focal line of the sunlight reflecting surface and at least one heat receiver tube, which is arranged in the focal line of the Fresnel mirror.

The glass tube wall is transparent for a wide wavelength range of the rays of the sun. The glass tube wall of the glass tube comprises glass ($SiO_x$). Other transparent materials are possible, too. The infrared light reflective coating, which is attached to the inner surface of the glass tube, acts as a mirror for infrared light. By this, infrared light, which is radiated by the core tube of a heat receiver tube, is reflected back to the core tube. The overall thermal loss of the heat receiver tube by infrared light radiation of the core tube of the heat receiver tube is reduced.

The inner surface can comprise the infrared reflective coating on its complete circumference. But it is also possible, that the inner surface of the glass tube wall comprises the infrared light reflective coating is just on a part the circumference of the inner glass tube surface. For instance the inner surface of the glass tube is half covered by the infrared reflective coating.

Using trough technology, the heat receiver tube is arranged in a focal line of parabolic mirrors. Since the sun incident to the trough parabola downwards, rays of the sunlight are collimated onto a lower half of the core tube circumference. An upper half of the core tube circumference is directly hit by rays of the sun (estimated to be about 1.2% from total incident rays) and stray rays, which come from mirror distortion and statistical aberration (estimated to be about 0%-2% (This depends on the two segmental coatings) of the total incident rays). The inner surface of the glass tube wall is divided into two areas. One area, which is located face to face to the sunlight reflecting surface of the mirror, has got a high transmission for the complete sunlight radiation. In contrast to that, the area, which is face to face to the sun and which is averted to the sunlight reflecting surface of the mirror, has got a high reflectivity for infrared light. There is a minor loss concerning the direct infrared radiation coming from the sun. But the reduction of thermal loss via infrared radiation emission of the core tube multiply compensates the minor loss.

In an embodiment of the glass tube the infrared light reflective coating comprises a transmission for solar radiation with a wavelength below 1200 nm, which is selected from the range between 0.5 and 0.99 and may also be selected form the range between is 0.8 and 0.95. The infrared light reflective coating is more or less transparent for the sunlight radiation in this wavelength area.

The infrared light reflective coating comprises a transparent (electrically) conducting coating (transparent conducting coating, TCO). In an embodiment the transparent conducting coating comprises a tin oxide (SnO). The tin oxide comprises at least one element, which is selected from the group consisting of aluminum, gallium and indium. This element can be a main component of the tin oxide. For instance the element is indium and the tin oxide is indium tin oxide (InSnO, IZO). The element can be a dopant, too. For instance such a tin oxide is doped by aluminum and aluminum oxide ($Al_2O_3$), respectively.

An additional layer can be attached onto the infrared light reflective coating. The additional layer covers at least partially or completely the infrared light reflective coating. The additional layer is transparent of nearly transparent for the infrared light of the sun. For instance such a layer is a layer comprising a low refractive index material like aluminum $Al_2O_3$) oxide or silicon oxide ($SiO_2$).

Between the surface of the glass tube wall and the infrared light reflective coating there can be an intermediate layer. This intermediate layer can have different functions. For instance such an intermediate layer strengthens the adhesion of the infrared light reflective coating onto the inner surface of the glass tube.

For the attaching the infrared reflective coating there can be applied different technologies. The attaching of the infrared light reflective coating is carried out with the aid of at least one technology, which is selected form the group consisting of dip coating, spray coating and atomic layer deposition. Whereas dip coating or spray coating fit to a partially attaching the infrared light reflective coating onto the inner surface of the glass tube (the infrared light reflective coating covers partially the inner surface of the glass tube) the atomic layer deposition (ALD) fits to the complete covering of the inner surface of the glass tube. Additional layers beside the TCO ($Al_2O_3$ or $SiO_2$) are used in order to optimize anti reflection layers stuck in the solar spectrum while reflectance in IR region is not interrupted (or changed). A final layer with low index material (e.g. $SiO_x$) will be deposited (for instance by dip coating) on both sides of the glass tube.

The parabolic trough collector can be used in a power plant for converting solar energy into electrical energy.

BRIEF DESCRIPTION

Further features and advantages of the invention are produced from the description of an exemplary embodiment with reference to the drawings. The drawings are schematic.

DETAILED DESCRIPTION

Figure 1:
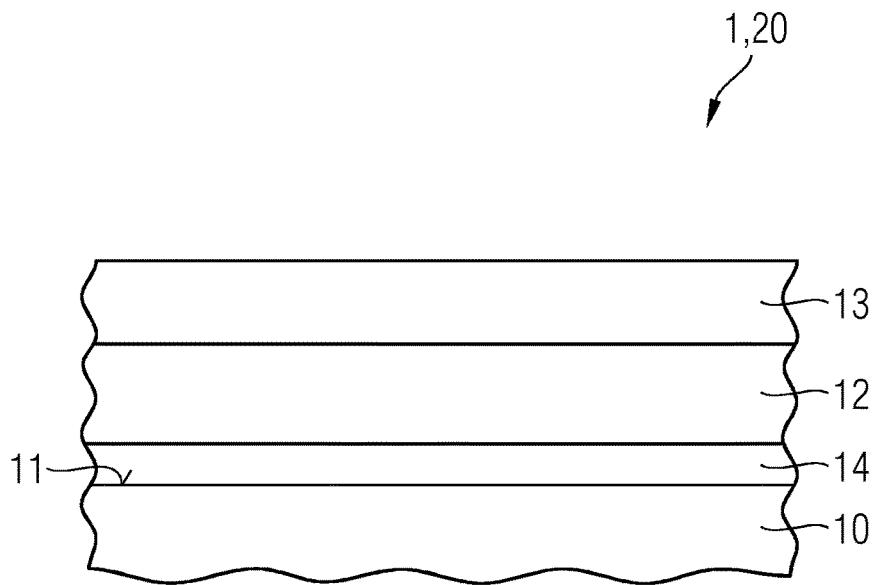
FIG. 1 shows a cross section of a glass tube from the side.
Figure 2:
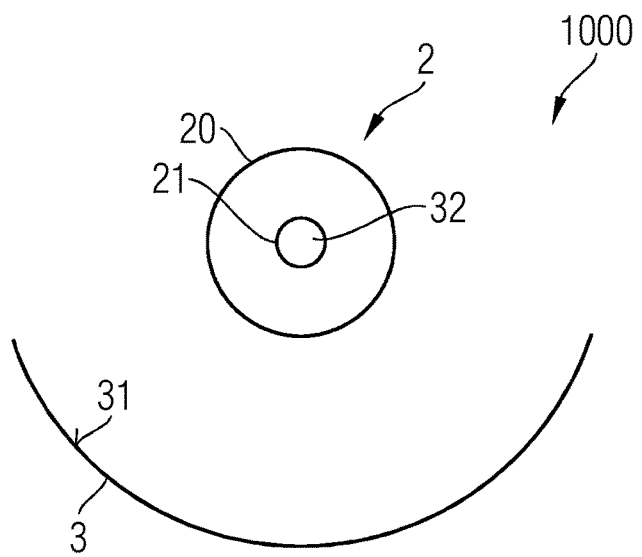
FIG. 2 shows a cross section of a parabolic through collector with the heat receiver tube comprising an encapsulation with the glass tube.

Given is a glass tube 1 with a glass tube wall 10. The inner surface 11 of the glass tube wall 10 comprises at least partially at least one infrared light reflective coating 12. The glass tube 1 is an encapsulation 20 of a heat receiver tube 2.

The infrared light reflective coating 12 comprises indium tin oxide. The thickness of the infrared light reflective coating 12 is about 135 nm.

The infrared light reflective coating 12 is covered by an additional layer 13. This additional layer 13 comprises silicon oxide. In an alternative example the additional layer 13 comprises aluminum oxide. The thickness of this additional layer 13 is about 120 nm.

An alternatively following sequence is implemented: Inner side of glass tube/$Al_2O_3$ (30 nm)/TCO (150 nm)/$Al_2O_3$ (50 nm)/$SiO_x$ (120 nm-Dip coat).

Between the infrared light reflective coating 12 and the inner surface 11 of the glass tube wall 10 there is an intermediate layer 14. This intermediate layer comprises aluminum oxide. The thickness of this intermediate layer is about 85 nm.

The core tube 21 of the heat receiver tube 2, which is enveloped by the glass tube 1, is made of steel. Additionally the core tube surface of the core tube comprises an absorptive coating for absorbing sunlight (not shown).

EXAMPLE 1

By using half coating of the inner surface of the glass tube (dip and spray coating), a (absorptivity for the sunlight) will be reduced only by small fraction (0.2%) due to reduction of glass transmissivity on the upper segment of the glass tube. Heat losses due to radiation will be reduced by 20%-10% (from 1000 Watt/tube to 800-900 Watt/tube).

EXAMPLE 2

The complete inner surface 11 of the glass tube wall 10 is covered by the infrared light reflective coating 12. For the manufacturing an ALD process is carried out. By this a will be reduced by 1%-1.5% due to decrease in solar transmissivity thorough the glass tube. But on the other hand, heat losses due to radiation will be reduced by 40%-60% (from 1000 Watt/tube to 600-400 Watt/tube. The heat receiver tube 2 is part of a parabolic trough collector 1000. The parabolic trough collector 1000 comprises at least one parabolic mirror 3 with a sunlight reflective surface 31. By the reflective surface 31 sunlight is concentrated in the focal line 32 of the parabolic mirror 3. The concentrated sunlight is absorbed by the heat receiver tube 2.

The parabolic trough collector (and the Fresnel mirror collector, respectively) is used in a solar power plant for converting solar energy into electrical energy. The heated heat transfer fluid is used to produce steam via a heat exchanger. The steam is driving a turbine, which is connected to a generator. The generator produces current.

The invention claimed is:

1. A heat receiver tube for absorbing solar energy and for transferring absorbed solar energy to a heat transfer fluid located inside a core tube of the heat receiver tube, wherein:
   the heat transfer fluid is a thermo-oil;
   the core tube comprises a core tube surface with a solar energy absorptive coating for absorbing solar absorption radiation of the sunlight;
   the core tube is enveloped by an encapsulation with a glass tube with a glass tube wall, wherein a space between the core tube and the encapsulation is evacuated;
   an inner surface of the glass tube wall comprises at least partially at least one infrared light reflective coating;
   the infrared light reflective coating includes a transparent conducting coating comprising indium tin oxide, wherein the transparent conducting coating is configured to permit solar absorption radiation to impinge the core tube, and wherein the transparent conducting coating is configured to capture infrared radiation radiating from the core tube and direct the infrared radiation back to the core tube;
   an intermediate layer of aluminum oxide arranged between the inner surface of the glass tube wall and the infrared light reflective coating;
   an additional layer of aluminum oxide or silicon oxide covering the infrared light reflective coating, wherein the additional layer is between the infrared light reflective coating and the solar energy absorptive coating such that the additional layer is adjacent to the infrared light reflective coating and the space;

the core tube surface and the encapsulation are arranged in a distance between the core tube surface and the inner surface of the glass tube wall with the infrared reflective surface such, that the solar absorption radiation can penetrate the encapsulation with the infrared light reflective coating and can impinge the solar energy absorptive coating.

2. The heat receiver tube according to claim 1, wherein the infrared light reflective coating comprises a transmission for solar radiation with a wavelength below 1200 nm, which is selected from a range between 0.5 and 0.99.

3. The heat receiver tube according to claim 1, wherein the inner surface of the glass tube wall comprises the infrared light reflective coating on a part of its circumference.

4. The heat receiver tube according to claim 1, wherein the tin oxide is doped with aluminum or aluminum oxide.

5. A parabolic trough collector comprising
at least one parabolic mirror having a sunlight reflecting surface for concentrating sunlight in a focal line of the sunlight reflecting surface; and
at least one heat receiver tube according to claim 1, which is arranged in the focal line of the parabolic mirror.

6. A method for manufacturing a glass tube of a heat receiver tube according to claim 1, the method comprising following steps:
a) providing a glass tube; and
b) attaching the infrared light reflective coating onto an inner surface of the glass tube.

7. The method according to claim 6, wherein the attaching the infrared light reflective coating is carried out with the aid of at least one technology, which is selected fefrom the group consisting of dip coating, spray coating and atomic layer deposition.

8. The heat receiver tube according to claim 1, wherein the infrared light reflective coating comprises a transmission for solar radiation with a wavelength below 1200 nm, which is selected form a range between is 0.8 and 0.95.

9. The heat receiver tube according to claim 1, wherein the thickness of the additional layer is about 120 nm.

10. A heat receiver tube for absorbing solar energy and for transferring absorbed solar energy to a heat transfer fluid, which can be located inside a core tube of the heat receiver tube, wherein:
the heat transfer fluid is a thermo-oil;
the core tube comprises a core tube surface with a solar energy absorptive coating for absorbing solar absorption radiation of the sunlight;
the core tube is enveloped by an encapsulation with a glass tube with a glass tube wall, wherein a space between the core tube and the encapsulation is evacuated;
an inner surface of the glass tube wall comprises a first area configured to face sunlight reflecting off of a mirror surface, and a second area configured to face the sun; wherein the first area comprises a high transmission for complete sun radiation, and the second area has a high reflectivity for infrared light;
at least one infrared light reflective coating defined by the second area, wherein the infrared light reflective coating includes a transparent conducting coating comprising indium tin oxide, wherein the transparent conducting coating is configured to permit solar absorption radiation to impinge the core tube, and wherein the transparent conducting coating is configured to capture infrared radiation radiating from the core tube and direct the infrared radiation back to the core tube;
wherein between the surface of the glass tube wall and the infrared light reflective coating is an intermediate layer of aluminum oxide;
the core tube surface and the encapsulation are arranged in a distance between the core tube surface and the inner surface of the glass tube wall with the infrared reflective surface such, that the solar absorption radiation can penetrate the encapsulation with the infrared light reflective coating and can impinge the solar energy absorptive coating.

11. The heat receiver tube according to claim 10, wherein the infrared light reflective coating is covered by an additional layer.

12. The heat receiver tube according to claim 11, wherein the additional layer comprises silicon oxide or aluminum oxide.

13. The heat receiver tube according to claim 12, wherein the thickness of the additional layer is about 120 nm.

14. A solar power plant for converting solar power plant into electrical energy comprising:
a steam generator;
a heat exchanger, for generating steam for the steam generator; and
a heat receiver tube as set forth in claim 1, wherein said heat receiver tube heats the thermo-oil as a heat transfer fluid to thereby generate the steam in the heat exchanger.

15. The method of claim 6 for manufacturing a glass tube of a heat receiver according to claim 1, wherein the attaching the infrared light reflective coating onto an inner surface of the glass tube includes at least one of dip coating and spray coating a first area of the inner surface of the glass tube such that the first area comprises a high transmission for complete sun radiation, and a second area of the inner surface of the glass tube has a high reflectivity for infrared light.

16. The solar power plant of claim 14, wherein the inner surface of the glass tube of the heat receiver tube comprises a first area configured to face sunlight reflecting off of a mirror surface, and a second area configured to face the sun; wherein the first area comprises a high transmission for complete sun radiation, and the second area has a high reflectivity for infrared light.

* * * * *